Patented Sept. 19, 1944

2,358,661

UNITED STATES PATENT OFFICE 2,358,661

PRODUCTION OF MAGNESIUM SULPHIDE

Theodore W. Sarge, Midland, Mich., assignor to The Dow Chemical Company, Midland, Mich., a corporation of Michigan No Drawing. Application December 26, 1942, Serial No. 470,229

4 Claims. (Cl. 23—134)

This invention relates to an improved method of producing magnesium sulphide.

As is known, magnesium sulphide has been recommended as an agent in the control of metallurgical slags and fluxes, and as an ingredient in inorganic chemical syntheses. Despite these indications of promise, magnesium sulphide has never become a commercial material because of the difficulty of making it on any appreciable scale. In particular, the methods of preparation heretofore known have either involved serious explosion hazards, have been applicable only on a microchemical scale, have given exceedingly low yields of the material, or have required the use of rare and expensive starting reagents.

With these difficulties in mind, it is the principal object of the present invention to provide a simple method of producing magnesium sulphide in high yields from readily available materials. Another object is to provide a process in which the magnesium sulphide obtained is in the crystalline state, instead of in the form of amorphous powder as heretofore.

The invention depends upon the discovery that dry magnesium chloride will react with dry hydrogen sulphide to form crystalline magnesium sulphide, with simultaneous liberation of hydrogen chloride, as represented by the equation

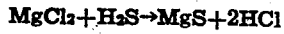

$$MgCl_2 + H_2S \rightarrow MgS + 2HCl$$

In making magnesium sulphide according to the new process, a current of gaseous hydrogen sulphide is passed into intimate contact with a body of magnesium chloride maintained at a reaction temperature, usually between about 700° C. and about 900° C., for a time sufficient to convert it to magnesium sulphide, usually for 2 to 10 hours or more, depending upon the physical state of the magnesium chloride. During the process, hydrogen chloride is continuously formed as a gas and is withdrawn, while the magnesium sulphide produced remains in the reaction zone in the form of a crystalline mass of pinkish-white color. The process is preferably carried out in the absence of moisture and oxidizing agents to avoid converting any of the sulphide formed to magnesium oxide.

In a particularly convenient form of the process, magnesium chloride is charged into the reaction zone, which may be an externally-heated tube furnace or rotary kiln, and heated to a temperature of 700° to 900° C., and a current of hydrogen sulphide or a dry gas chemically inert to magnesium chloride, such as hydrogen chloride, nitrogen, hydrogen, or a noble gas, is passed through the zone to expel air and any water present in the magnesium chloride. A stream of hydrogen sulphide is then forced through the zone while it is still at a reaction temperature for a time sufficient to convert the magnesium chloride to magnesium sulphide.

It is not essential, unless magnesium sulphide of extraordinary purity is required, that the magnesium chloride used be anhydrous, since any water of hydration present will be driven off in the early stages of the process. This evolution of water does not interfere with subsequent formation of magnesium sulphide, but may tend to form a small proportion of magnesium oxide which is not disadvantageous for many of the uses to which magnesium sulphide is placed.

The following example will illustrate the invention but is not to be construed as limiting its scope:

Example

A mass of crude anhydrous magnesium chloride (containing 83.6 per cent magnesium chloride, 13 per cent magnesium oxide, balance mostly water) was charged into a tube furnace heated to a temperature of 700° C. while dry hydrogen sulphide was passed through the furnace until all water present was removed. The flow of hydrogen sulphide was then continued at 750° C. for 8 hours, after which the furnace was cooled to room temperature while continuing the flow of gas. The product obtained was a crystalline powder containing 89.2 per cent magnesium sulphide, 8.3 per cent magnesium oxide and 1.8 per cent magnesium chloride.

If it is desired to produce mixtures of magnesium sulphide and magnesium chloride, such as have been recommended for use in the electrolytic production of magnesium, these may be readily prepared according to the invention simply by discontinuing the reaction of hydrogen sulphide with magnesium chloride before the latter is entirely consumed.

Other modes of applying the principle of the invention may be employed instead of those explained, change being made as regards details, provided the steps recited in any of the following claims or the equivalent thereof are used.

I claim:

1. A method of preparing magnesium sulphide which comprises passing hydrogen sulphide into contact with anhydrous magnesium chloride maintained at a reaction temperature above about 700° C. so as to produce magnesium sulphide.

2. A method of preparing magnesium sulphide which comprises passing a current of dry hydrogen sulphide into intimate contact with a body of anhydrous magnesium chloride maintained at a reaction temperature above about 700° C. under non-oxidizing conditions so as to produce magnesium sulphide and hydrogen chloride; and withdrawing the hydrogen chloride as it is formed.

3. A method according to claim 2 wherein the magnesium chloride is maintained at a temperature between about 700° C. and about 900° C.

4. A method of preparing magnesium sulphide which comprises heating a body of anhydrous magnesium chloride to a temperature between about 700° C. and about 900° C. and passing a current of a dry gas chemically inert thereto over the same to expel any water present therein, and thereafter passing a current of hydrogen sulphide into intimate contact with the said magnesium chloride while maintaining said temperature so as to produce magnesium sulphide and hydrogen chloride; and withdrawing the hydrogen chloride as it is formed.

THEODORE W. SARGE.